(12) United States Patent
Hu

(10) Patent No.: US 8,001,408 B2
(45) Date of Patent: Aug. 16, 2011

(54) DUAL VOLTAGE SWITCHING CIRCUIT

(75) Inventor: Ke-You Hu, Shenzhen (CN)

(73) Assignees: Hong Fu Jin Precision (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 507 days.

(21) Appl. No.: 12/210,538

(22) Filed: Sep. 15, 2008

(65) Prior Publication Data
US 2010/0037075 A1   Feb. 11, 2010

(30) Foreign Application Priority Data
Aug. 11, 2008   (CN) .......................... 2008 1 0303661

(51) Int. Cl.
*G06F 1/00* (2006.01)
(52) U.S. Cl. ....................... 713/323; 365/229
(58) Field of Classification Search ................. 713/320, 713/323, 330; 365/229
See application file for complete search history.

(56) References Cited

U.S. PATENT DOCUMENTS

| | | | | |
|---|---|---|---|---|
| 4,532,443 | A | * | 7/1985 | Glennon ........................ 327/404 |
| 5,384,747 | A | * | 1/1995 | Clohset ......................... 365/226 |
| 5,815,455 | A | * | 9/1998 | Braithwaite et al. .......... 365/229 |
| 6,523,128 | B1 | * | 2/2003 | Stapleton et al. ............. 713/330 |
| 6,775,784 | B1 | * | 8/2004 | Park ............................. 713/320 |
| 7,774,633 | B1 | * | 8/2010 | Harrenstien et al. .......... 713/323 |
| 2008/0168288 | A1 | * | 7/2008 | Jia et al. ....................... 713/323 |

* cited by examiner

*Primary Examiner* — Thomas Lee
*Assistant Examiner* — Xuxing Chen
(74) *Attorney, Agent, or Firm* — Clifford O. Chi

(57) ABSTRACT

A dual voltage switching circuit includes a first resistor and two transistors. Each transistor has a first terminal, a second terminal, and a third terminal. The first terminals are connected to a control terminal of a computer. The second terminals are connected to a standby power supply of the computer. The third terminals are connected to a power-on terminal of the computer via the first resistor. When the first terminals receive a low level signal from the control terminal, the first and second transistors are on, and the power-on terminal receives a voltage form the standby power supply via the first resistor.

12 Claims, 2 Drawing Sheets

DUAL VOLTAGE SWITCHING CIRCUIT

BACKGROUND

1. Field of the Invention

The present invention relates to a dual voltage switching circuit for a computer.

2. Description of the Related Art

In general, a computer can be configured by a user to enter a sleep mode to protect the computer and save energy by setting the advanced configuration and power interface (ACPI). The user can wake up the computer from sleep mode, by pressing a key on the keyboard, or by moving or pressing the keys on the mouse.

A working voltage is provided by a dual voltage switching circuit. When the computer is in a work mode, the dual voltage switching circuit provides a 5V system voltage. When the computer is in the sleep mode, the dual voltage switching circuit provides a 5V standby (5V_SB) voltage. The 5V_SB voltage is received by a power-on terminal of the computer via a transistor. When the power-on terminal receives a low voltage signal, the computer is powered on. However, power is also provided to peripheral equipments of the computer via the transistor. The transistor may be damaged by an overload current when too many peripheral devices, such as keyboards, mice, and USB devices, are connected to the computer at once. Therefore, the power-on terminal is unable to power up the computer due to the damaged transistor.

What is needed, therefore, is a dual voltage switching circuit to over come the above-described shortcoming.

DETAILED DESCRIPTION OF THE EMBODIMENTS

Figure 1:
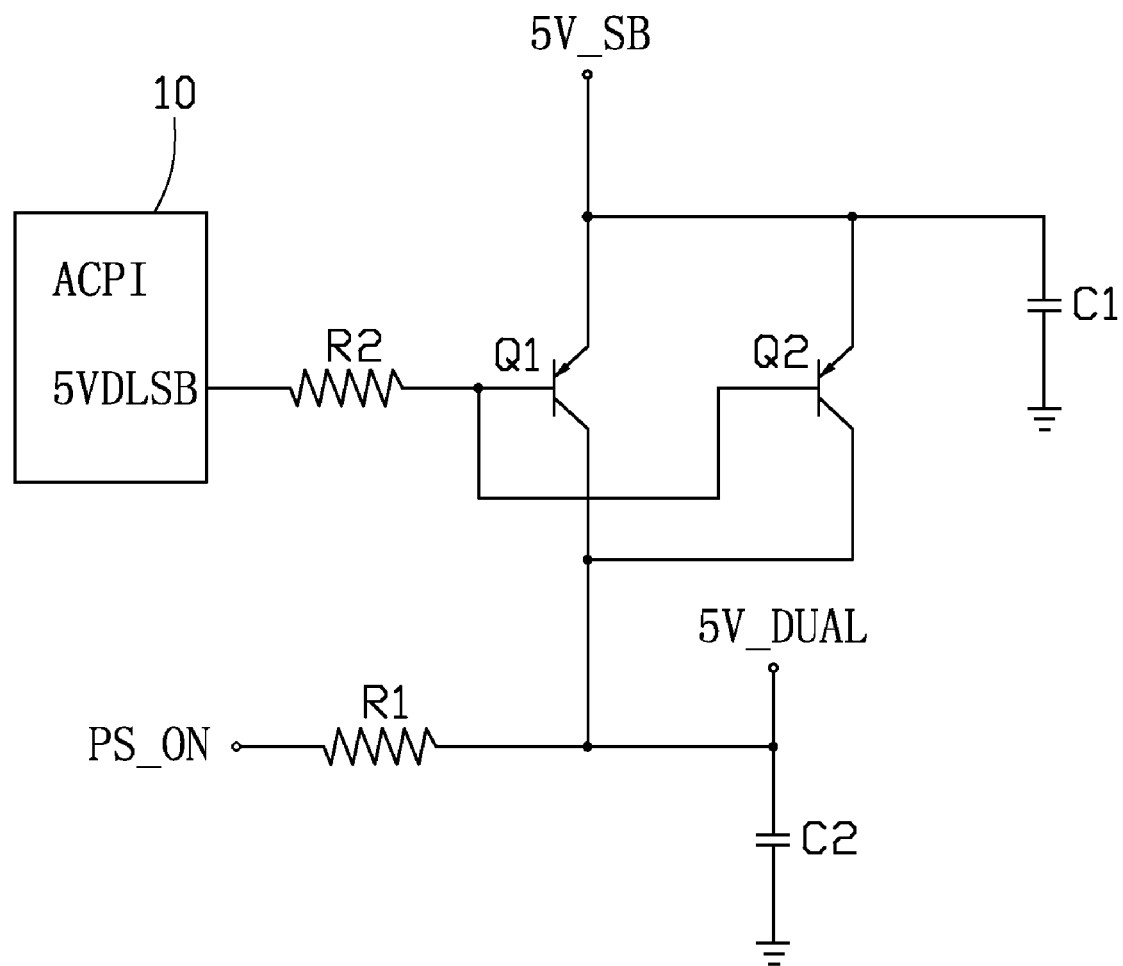
FIG. 1 is a circuit diagram of an embodiment of a dual voltage switching circuit.

Referring to FIG. 1, an embodiment of a dual voltage switching circuit includes an ACPI chip 10, a first transistor Q1, a second transistor Q2, a first resistor R1, a second resistor R2, a first capacitor C1, and a second capacitor C2. The ACPI chip 10 includes a control pin 5VDLSB. The two transistors Q1 and Q2 may be positive-negative-positive (pnp) bipolar junction transistors (bjt). The transistor Q1 and Q2 may also be P-channel metallic oxide semiconductor field effect transistors. The bases of the two transistors Q1 and Q2 are connected to the control pin 5VDLSB via the second resistor R2. The emitters of the two transistors Q1 and Q2 are connected to a standby power supply 5V_SB, and connected to ground via the first capacitor C1. The collectors of the two transistors Q1 and Q2 are connected to a power-on terminal PS_ON of a computer via the first resistor R1, and connected to ground via the second capacitor C2. The power-on terminal PS_ON is configured to power up the computer when a low level signal is received.

In this exemplary embodiment, the capacitors C1 and C2 are configured to eliminate noise of the standby power supply 5V_SB. The standby power supply 5V_SB is configured to outputs a dual voltage 5V_DUAL when the two transistors Q1 and Q2 are turned on.

Figure 2:
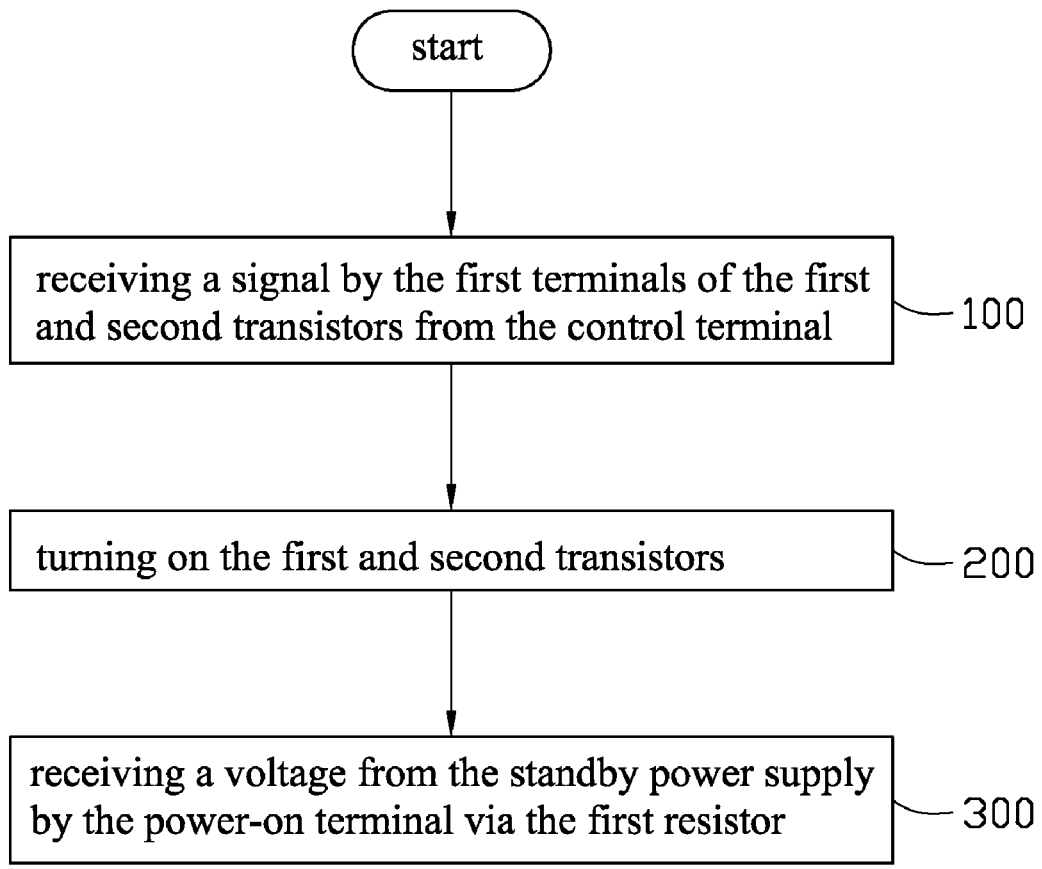
FIG. 2 is a flow chart of an embodiment of a dual voltage switching method.

Referring to FIG. 2, is a dual voltage switching method used in the circuit of FIG. 1. Depending on the embodiment, certain of the steps described below may be removed, others may be added, and the sequence of steps may be altered.

Step 100: receiving a signal by the bases of the two transistors Q1 and Q2 from the control pin 5VDLSB of the ACPI chip 10.

Step 200: turning on the two transistors Q1 and Q2.

Step 300: receiving the dual voltage 5V_DUAL from the standby power supply 5V_SB by the power-on terminal PS_ON via the first resistor R1.

When the computer is in a sleep mode, the control pin 5VDLB outputs a low level signal, and the two transistors Q1 and Q2 are both turned on. The standby power supply 5V_SB outputs the dual voltage 5V_DUAL via the two transistors Q1 and Q2. The dual voltage 5V_DUAL is configured to provide power to peripheral devices connected to the computer and the power-on terminal PS_ON. The voltage of the power-on terminal PS_ON is now at a high level.

A load current of the peripheral equipments is divided by the two transistors Q1 and Q2, to avoid an overloaded current. For example, an upper limit of the load current in a conventional dual voltage switching circuit is 600 milliamps (mA). When two USB devices are connected to the computer, the load current may be up to 656 mA. This is higher than the upper limit of the load current, and the transistor could be destroyed or damaged. This overload situation can be avoided by dividing the load current by having two transistors instead of one. Thus, the load current through each of the two transistors Q1 and Q2 will be lower than the upper limit of the load current. Therefore, transistors Q1 and Q2 have a decreased likelihood of being destroyed or damaged and can work normally to ensure that the standby power supply 5V_SB outputs the dual voltage 5V_DUAL to the power-on terminal PS_ON. Thus the power-on terminal PS_ON can be triggered to output a low level signal to power up the computer, by pressing the power button of a computer panel, and the computer enters a work mode.

When the computer is in the work mode, the control pin 5VDLSB outputs a high level signal to turn off the two transistors Q1 and Q2. A system power supply of the computer outputs the dual voltage 5V_DUAL under the control of the ACPI chip 10.

The foregoing description of the embodiments of the invention has been presented only for the purposes of illustration and description and is not intended to be exhaustive or to limit the embodiments to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternately embodiments will become apparent to those skilled in the art to which the present invention pertains without departing from its spirit and scope. Accordingly, the scope of the embodiments is defined by the appended claims rather than the foregoing description and the embodiments described therein.

What is claimed is:

1. A dual voltage switching circuit comprising:
    a first resistor;
    a first transistor comprising a first terminal, a second terminal, and a third terminal; and
    a second transistor comprising a first terminal, a second terminal, and a third terminal;
    wherein the first terminals of the first and second transistors are configured to connect to a control terminal of a computer, the second terminals of the first and second transistors are configured to connect to a standby power supply of the computer, and the third terminals of the first and second transistors are configured to connect to a power-on terminal of the computer via the first resistor and selectively connected to at least a peripheral device of the computer; upon the condition the first terminals receive a low level signal from the control terminal, the first and second transistors are on, and the power-on terminal receives a voltage from the standby power supply via the first resistor.

2. The dual voltage switching circuit of claim 1, further comprising an advanced configuration and power interface chip having a 5VDLSB pin connected to the first terminals of the first and second transistors.

3. The dual voltage switching circuit of claim 1, further comprising a second resistor, wherein the first terminals of the first and second transistors are connected to the control terminal via the second resistor.

4. The dual voltage switching circuit of claim 1, further comprising a first capacitor and a second capacitor, wherein the second terminals of the first and second transistors are connected to ground via the first capacitor; the third terminals of the first and second transistors are connected to ground via the second capacitor.

5. The dual voltage switching circuit of claim 1, wherein the first and second transistors are positive-negative-positive bipolar junction transistors; the first terminals of the first and second transistors are bases, the second terminals of the first and second transistors are emitters, and the third terminals of the first and second transistors are collectors.

6. The dual voltage switching circuit of claim 1, wherein the first and second transistors are P-channel metallic oxide semiconductor field effect transistors; the first terminals of the first and second transistors are gates, the second terminals of the first and second transistors are sources, and the third terminals of the first and second transistors are drains.

7. A dual voltage switching method comprising:
providing a dual voltage switching circuit comprising:
a first resistor;
a first transistor comprising a first terminal, a second terminal, and a third terminal; and
a second transistor comprising a first terminal, a second terminal, and a third terminal, wherein the first terminals of the first and second transistors are connected to a control terminal of a computer, the second terminals of the first and second transistors are connected to a standby power supply of the computer, and the third terminals of the first and second transistors are connected to a power-on terminal of the computer via the first resistor, and selectively connected to at least a peripheral device of the computer;
receiving a signal by the first terminals of the first and second transistors from the control terminal;
turning on the first and second transistors; and
receiving a voltage from the standby power supply by the power-on terminal via the first resistor.

8. The method as claimed in claim 7, wherein the circuit further comprises an advanced configuration and power interface chip having a 5VDLSB pin as the control terminal of the computer.

9. The method of claim 7, wherein the circuit further comprises a second resistor; the first terminals of the first and second transistors receives the signal from the control terminal via the second resistor.

10. The method of claim 7, wherein the circuit further comprises a first capacitor and a second capacitor; the second terminals of the first and second transistors are connected to ground via the first capacitor; the third terminals of the first and second transistors are connected to ground via the second capacitor.

11. The method of claim 7, wherein the signal is a low level signal; the first and second transistors are positive-negative-positive bipolar junction transistors; the first terminals of the first and second transistors are bases, the second terminals of the first and second transistors are emitters, and the third terminals of the first and second transistors are collectors.

12. The method of claim 7, wherein the signal is a low level signal; the first and second transistors are P-channel metallic oxide semiconductor field effect transistors; the first terminals of the first and second transistors are gates, the second terminals of the first and second transistors are sources, and the third terminals of the first and second transistors are drains.

* * * * *